(12) United States Patent
Chandramouli (10) Patent No.: US 10,477,366 B2
(45) Date of Patent: Nov. 12, 2019

(54) APPARATUSES AND METHODS TO INTRODUCE FLEXIBLE SUPPORT FOR SERVICES

(71) Applicant: NOKIA SOLUTIONS AND NETWORKS OY, Espoo (FI)

(72) Inventor: Devaki Chandramouli, Plano, TX (US)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/324,562

(22) PCT Filed: Jul. 8, 2015

(86) PCT No.: PCT/US2015/039512
§ 371 (c)(1),
(2) Date: Jan. 6, 2017

(87) PCT Pub. No.: WO2016/007600
PCT Pub. Date: Jan. 14, 2016

(65) Prior Publication Data
US 2017/0201849 A1 Jul. 13, 2017

Related U.S. Application Data

(60) Provisional application No. 62/021,930, filed on Jul. 8, 2014.

(51) Int. Cl.
*H04M 3/42* (2006.01)
*H04W 4/50* (2018.01)
(Continued)

(52) U.S. Cl.
CPC .............. *H04W 4/50* (2018.02); *H04W 4/24* (2013.01); *H04W 12/08* (2013.01); *H04W 76/12* (2018.02);
(Continued)

(58) Field of Classification Search
CPC ... H04W 72/0406; H04W 8/245; H04W 4/02; H04L 29/08108; H04M 1/72519; H04M 1/72525; H04M 1/72522; H04M 22/0718
(Continued)

(56) References Cited

U.S. PATENT DOCUMENTS 8,077,837 B1* 12/2011 Wright .................... H04L 51/14
379/88.12
9,596,007 B2* 3/2017 Asakura ............... H04B 5/0056
(Continued)

FOREIGN PATENT DOCUMENTS

EP         2568728 A2    3/2013
WO   WO 2014/053170 A1  4/2014

OTHER PUBLICATIONS

International Search Report and Written Opinion dated Sep. 23, 2015 corresponding to International Application No. PCT/US2015/039512.
(Continued)

*Primary Examiner* — Danh C Le
(74) *Attorney, Agent, or Firm* — Squire Patton Boggs (US) LLP (57) ABSTRACT

Systems, methods, apparatuses, and computer program products that provide flexible support for services are provided. One method includes receiving, by a network node, a request type from a user equipment, where the request type indicates types of services required by the user equipment from the network. The method may also include using the received request type to make determinations regarding a provision of services to the user equipment.

15 Claims, 6 Drawing Sheets

(51) Int. Cl.
  *H04W 76/12* (2018.01)
  *H04W 12/08* (2009.01)
  *H04W 4/24* (2018.01)
  *H04M 1/725* (2006.01)
  *H04W 88/02* (2009.01)

(52) U.S. Cl.
  CPC .... *H04M 1/72519* (2013.01); *H04M 1/72522* (2013.01); *H04W 88/02* (2013.01)

(58) Field of Classification Search
  USPC ............... 455/414.1, 418, 550.1; 370/329
  See application file for complete search history.

(56) References Cited

U.S. PATENT DOCUMENTS

| | | | |
|---|---|---|---|
| 2005/0138144 A1 | 6/2005 | Sethi | |
| 2006/0142020 A1* | 6/2006 | Mueckenheim | H04W 72/0486 455/453 |
| 2007/0286118 A1 | 12/2007 | Sohn | |
| 2008/0304458 A1* | 12/2008 | Aghvami | H04W 48/16 370/338 |
| 2010/0182955 A1* | 7/2010 | Bjork | H04W 28/16 370/328 |
| 2011/0237269 A1* | 9/2011 | Chen | H04W 36/0088 455/450 |
| 2011/0269470 A1* | 11/2011 | Song | H04W 36/0072 455/436 |
| 2011/0320555 A1 | 12/2011 | Qiu et al. | |
| 2012/0077456 A1* | 3/2012 | Tiwari | H04W 48/16 455/404.1 |
| 2013/0070711 A1* | 3/2013 | Yin | H04L 12/4633 370/329 |
| 2013/0089033 A1 | 4/2013 | Kahn et al. | |
| 2013/0170347 A1* | 7/2013 | Zhang | H04W 4/70 370/230 |
| 2013/0188747 A1* | 7/2013 | Cheong | H04L 1/0031 375/295 |
| 2013/0229931 A1* | 9/2013 | Kim | H04W 24/10 370/252 |
| 2013/0286982 A1* | 10/2013 | Chen | H04W 4/12 370/329 |
| 2014/0004866 A1 | 1/2014 | Dalsgaard et al. | |
| 2014/0064209 A1* | 3/2014 | Anchan | H04W 72/0406 370/329 |
| 2014/0094139 A1* | 4/2014 | Xu | H04L 41/0893 455/406 |
| 2014/0140282 A1* | 5/2014 | Zhou | H04W 76/02 370/328 |
| 2014/0141763 A1* | 5/2014 | Suh | H04W 4/001 455/418 |
| 2014/0148180 A1* | 5/2014 | Cave | H04W 28/16 455/452.1 |
| 2014/0155074 A1* | 6/2014 | Xu | H04W 76/00 455/450 |
| 2014/0171108 A1* | 6/2014 | Waters | H04W 4/02 455/456.1 |
| 2014/0243038 A1* | 8/2014 | Schmidt | H04W 4/90 455/552.1 |
| 2015/0049697 A1* | 2/2015 | Worrall | H04W 72/0413 370/329 |
| 2015/0078231 A1* | 3/2015 | Bergstrom | H04W 72/1242 370/311 |
| 2015/0111571 A1* | 4/2015 | Tanikawa | H04W 36/14 455/434 |
| 2015/0128205 A1* | 5/2015 | Mahaffey | H04L 63/20 726/1 |
| 2015/0181373 A1* | 6/2015 | Xie | H04W 4/02 455/406 |
| 2015/0208450 A1* | 7/2015 | Mademann | H04W 4/20 370/329 |
| 2015/0356335 A1* | 12/2015 | Micelotta | G07C 11/00 340/10.1 |
| 2016/0142975 A1* | 5/2016 | Rune | H04W 4/70 455/574 |
| 2016/0262205 A1* | 9/2016 | Flynn | H04W 52/0212 |

OTHER PUBLICATIONS

3GPP TS 23.401 V12.4.0 (Mar. 2014), Technical Specification, 3rd Generation Partnership Project; Technical Specification Group Services and System Aspects; General Packet Radio Service (GPRS) enhancements for Evolved Universal Terrestrial Radio Access Network (E-UTRAN) access (Release 12), Mar. 2014, 302 pages.

Jan. 26, 2018 Search Report issued in Extended European Patent Application No. 15818478.8.

CATT, S2-073904, GBR Bearer handling in the Service Request and S1 Release procedure; 3GPP TSG SA WG2 Architecture—S2#59, 2007.

* cited by examiner

APPARATUSES AND METHODS TO INTRODUCE FLEXIBLE SUPPORT FOR SERVICES

CROSS REFERENCE TO RELATED APPLICATIONS

This application claims priority to U.S. provisional application No. 62/021,930, filed on Jul. 8, 2014. The entire contents of this earlier filed application are hereby incorporated by reference in its entirety.

BACKGROUND

Field

Embodiments of the invention generally relate to wireless communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) and/or future 5G radio access technology.

Description of the Related Art

Universal Mobile Telecommunications System (UMTS) Terrestrial Radio Access Network (UTRAN) refers to a communications network including base stations, or Node-Bs, and radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS).

Long Term Evolution (LTE) refers to improvements of the UMTS through improved efficiency and services, lower costs, and use of new spectrum opportunities. In particular, LTE is a 3rd Generation Partnership Project (3GPP) standard that provides for uplink peak rates of at least 50 megabits per second (Mbps) and downlink peak rates of at least 100 Mbps. LTE supports scalable carrier bandwidths from 20 MHz down to 1.4 MHz and supports both Frequency Division Duplexing (FDD) and Time Division Duplexing (TDD).

As mentioned above, LTE improves spectral efficiency in communication networks, allowing carriers to provide more data and voice services over a given bandwidth. Therefore, LTE is designed to fulfill future needs for high-speed data and media transport in addition to high-capacity voice support. Advantages of LTE include high throughput, low latency, FDD and TDD support in the same platform, an improved end-user experience, and a simple architecture resulting in low operating costs. In addition, LTE is an all internet protocol (IP) based network, supporting both IPv4 and IPv6.

The Evolved 3GPP Packet Switched Domain, which is also known as the Evolved Packet System (EPS), provides IP connectivity using the E-UTRAN.

SUMMARY

One embodiment is directed to a method, which may include receiving, by a network node, a request type from a user equipment. The request type may indicate types of services required by the user equipment from the network. The method may also include using the received request type to make determinations regarding a provision of services to the user equipment.

In an embodiment, the using step further comprises determining at least one of: whether the user equipment requires signaling connection only, whether user plane should be setup as part of attach procedure, whether the user equipment requires only one service for the life time of the registration, whether the user equipment requires "always on" connectivity, or whether the user equipment requires connectivity to a special service.

According to one embodiment, the method may also include establishing a user equipment context according to the determinations made using the received request type. In certain embodiments, the establishing further comprises providing at least one of: "attached for signaling only" connectivity, "attached for only one service" connectivity, or "attached with always on" connectivity. In an embodiment, the method may also include allocating radio resources and deciding on a scheduling method based on the type of connectivity. In some embodiments, the method may further include performing charging or billing based on the resources requested by the user equipment as indicated in the received request type.

Another embodiment is directed to an apparatus, which may include at least one processor and at least one memory including computer program code. The at least one memory and the computer program code are configured, with the at least one processor, to cause the apparatus at least to receive a request type from a user equipment. The request type may indicate types of services required by the user equipment from a network. The at least one memory and the computer program code may be further configured, with the at least one processor, to cause the apparatus at least to use the received request type to make determinations regarding a provision of services to the user equipment.

Another embodiment is directed to an apparatus, which may include receiving means for receiving a request type from a user equipment. The request type may indicate types of services required by the user equipment from the network. The apparatus may also include using means for using the received request type to make determinations regarding a provision of services to the user equipment.

In an embodiment, the using means may further comprise determining means for determining at least one of: whether the user equipment requires signaling connection only, whether user plane should be setup as part of attach procedure, whether the user equipment requires only one service for the life time of the registration, whether the user equipment requires "always on" connectivity, or whether the user equipment requires connectivity to a special service.

According to one embodiment, the apparatus may also include establishing means for establishing a user equipment context according to the determinations made using the received request type. In an embodiment, the establishing means may further comprise providing means for providing at least one of: "attached for signaling only" connectivity, "attached for only one service" connectivity, or "attached with always on" connectivity.

In certain embodiments, the apparatus may also include allocating means for allocating radio resources and deciding on a scheduling method based on the type of connectivity. According to one embodiment, the apparatus may further include performing means for performing charging or billing based on the resources requested by the user equipment as indicated in the received request type. In one embodiment, the apparatus may comprise an evolved node B (eNB).

Another embodiment is directed to a method, which may include determining, by a user equipment, types of services that the user equipment requires from a network based on a configuration stored within the user equipment. The method may then include sending a request type, indicating the types of services required by the user equipment, to the network.

In an embodiment, the request type may indicate that the user equipment requires at least one of: a signaling connection only, a signaling connection and network connectivity/internet services only, a signaling connection and network connectivity/default services based on subscription, or a signaling connection and network connectivity/other services as requested.

Another embodiment is directed to an apparatus, which may include at least one processor and at least one memory including computer program code. The at least one memory and the computer program code are configured, with the at least one processor, to cause the apparatus at least to determine types of services that the apparatus requires from a network based on a configuration stored within the apparatus, and to send a request type, indicating the types of services required by the apparatus, to the network.

Another embodiment is directed to an apparatus that includes determining means for determining types of services that the apparatus requires from a network based on a configuration stored within the apparatus, and sending means for sending a request type, indicating the types of services required by the apparatus, to the network.

In an embodiment, the request type indicates that the apparatus requires at least one of: a signaling connection only, a signaling connection and network connectivity/internet services only, a signaling connection and network connectivity/default services based on subscription, or a signaling connection and network connectivity/other services as requested. According to one embodiment, the apparatus may comprise a user equipment (UE).

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products that provide flexible support for services, as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Figure 1:
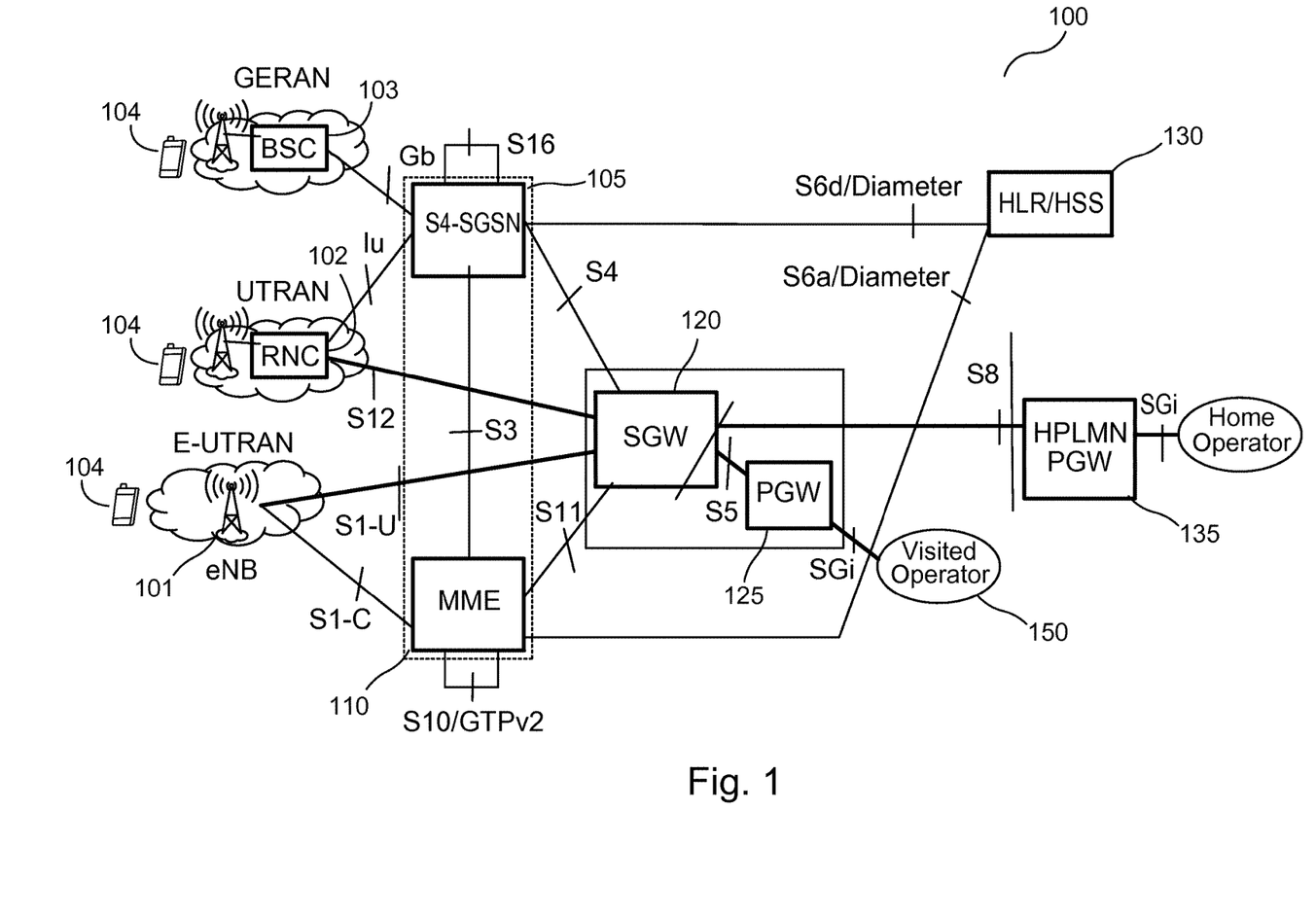
FIG. 1 illustrates a block diagram of a system according to an embodiment.

The evolved packet system (EPS) is the evolution of the general packet radio system (GPRS). EPS provides a new radio interface and new evolved packet core (EPC) network functions for broadband wireless data access. FIG. 1 illustrates an example of the EPS core network 100, according to an embodiment. As illustrated in FIG. 1, the EPS core network 100 includes the Mobility Management Entity (MME) 110, Packet Data Network Gateway (PGW) 125, and Serving Gateway (SGW) 120. MME 110 is connected to SGW 120 via the S1 interface, and the SGW 120 in turn is connected to PGW 125 via the S5 interface.

A common packet domain core network, such as EPS core network 100, can be used to provide core network functionality to the base station controller (BSC) 103 of the GSM/Edge radio access network (GERAN), the radio network controller (RNC) 102 of the UTRAN, and the eNodeB (eNB) 101 of the E-UTRAN.

MME 110 is considered the main control node for the core network 100. Some features handled by MME 110 include: bearer activation/de-activation, idle mode UE tracking, choice of SGW for a UE 104, intra-LTE handover involving core network node location, interacting with the home location register (HLR)/home subscriber server (HSS) 130 to authenticate user on attachment, and providing temporary identities for UEs 104.

HLR/HSS 130 is a central database that contains user-related and subscription-related information. Functions of the HLR/HSS 130 are related to mobility management, call and session establishment support, user authentication and access authorization.

SGW 120 is a data plane element within the core network 100. SGW 120 manages user plane (UP) mobility, acts as local mobility anchor and provides an UP interface to the radio access network(s). SGW 120 maintains the data path between the eNBs 101 and PGW 125. SGW 120 may also be in communication with home public land mobile network (HPLMN) PGW 135. PGW 125 provides connectivity for the UE to external packet data networks (PDNs). A UE 104 may have connectivity with more than one PGW 125 for accessing multiple PDNs 150.

A serving GPRS support node (SGSN) 105 may be provided in the core network 100 to transfer information to and from the GERAN and UTRAN via an Iu interface, for example. SGSN 105 communicates with SGW 120 via the S4 interface. SGSN 105 stores location information for a UE, such as routing area, and stores also user profiles, such as international mobile subscriber identity (IMSI).

One of the main principles behind EPS is the "always on" concept. When a UE performs initial attach, a default bearer is established and an IP address is allocated, and this remains until the UE is detached. In order to ensure that the UE is "always on", when the last bearer is deactivated, the UE is detached from the network.

Thus, according to current 3GPP LTE/SAE architecture, when UE registers with the network, it is assumed to be "always on" and a default bearer is always setup. While according to 2G/3G architecture, it is assumed that the UE does not require "always on" and therefore bearer/packet data protocol (PDP) context is not setup during attach. So, in both approaches, the behavior is pre-defined and not dynamic. Thus, a solution is needed that caters to different kinds of use cases and UE's requests in a more dynamic fashion.

In view of the above, in the current LTE architecture, one of the drawbacks is that the architecture and procedures assume that the devices require "always on" connectivity, where in reality they may not all require such "always on" connectivity. Furthermore, the LTE architecture assumes that user segregation and service segregration is required in every deployment scenario. For instance, in an enterprise, there may be home deployment scenario where printers, scanners, fax machines and any other connected devices need the ability to connect to the network. In addition, they can also communicate with each other directly (e.g., for file sharing etc.); in this case, user segregation and service segregation is not required and thus individual bearer setup for different services can be avoided. This kind of deployment may be supported in the current LTE architecture, but just not efficiently.

In the future, with $5^{th}$ generation (5G) radio and architecture, the ability to support a multitude of services will be needed. In addition, there will be a need to have the ability to support all use cases (smart phones, machine-to-machine (M2M) devices, PubS, device-to-device (D2D), etc.) supported by LTE architecture and also the ability to support them more efficiently. Further, there will be a need to have the ability to support additional use cases, such as enterprise deployment and local services more efficiently (e.g. connectivity within a LAN). In short, not all devices will require "always on" connectivity, user and service segregation.

Accordingly, as an example, embodiments provide the ability to serve at least the following classes of devices:
Ability to support devices that require signaling connection only
Ability to support devices that require both GBR and non-GBR services
Ability to support devices that may require network connectivity (ethernet services for LAN/IP connectivity/internet services only)
This is for enterprise deployment It should be noted that embodiments of the invention are not limited to serving the above noted class of devices, as certain embodiments may be directed to other configurations.

One embodiment of the invention introduces the ability to support different services based on the needs of the UE. Also, an embodiment introduces the ability for the network to support different UE(s) based on their needs and optimize resource allocation accordingly. Furthermore, certain embodiments introduce the means for the network to manage different UE(s) and UE contexts accordingly.

In an embodiment, the ability is provided for the UE to indicate its need when it attaches to the network and for the network to establish UE contexts and allocate/schedule radio resources according to the needs indicated by the UE. Accordingly, the following steps or functionalities may be provided according to certain embodiments:

1. Introduce a request type for the UE to indicate the type of services it needs. This can be determined based on configuration within the UE
   a. Signaling connection only (class A)
   b. Signaling connection +network connectivity/internet services only (class B)
   c. Signaling connection +network connectivity/default services based on subscription (class C)
   d. Signaling connection +network connectivity/other services as requested (class C)
2. Network uses the requests type to determine the following:
   a. Whether UE requires signaling connection only.
   b. Whether user plane should be setup as part of attach procedure.
   c. Whether UE requires only one service for the life time of the registration (also indicate whether service segregation is necessary or not).
   d. Whether UE requires "always on" connectivity.
   e. Whether UE requires connectivity to a special service.
3. Network establishes UE context accordingly.
   a. Network considers "Attached for signaling only". Allows subsequent service flow setup and ensures service segregation. Also, ensures that the UE is not detached when the last service flow is deactivated.
   b. Network considers "Attached for only one service". Subsequent service flow setup is not allowed. UE needs to detach and re-attach and use a different request type in order to request for more than one service.
   c. Network considers "Attached with always on connectivity". Subsequent service flow setup is allowed. When the last service flow is deactivated, UE can be deregistered from the network.
4. Network allocates radio resources and decides on the scheduling method based on the type of registration.
   a. If the UE belongs to class A or class C, then it ensures that user segregation and service segregation is possible. As a result, the network could decide that the UE may require individual service flow setup over the radio (and service flow based scheduling) (i.e. bearer based model). It can decide to perform class based scheduling for non-GBR services.
   b. If the UE belongs to class B, then it need not offer service segregation. So, the network could decide that all the user plane packets can be transmitted over the radio link without establishing logical radio bearers. It can also decide to perform class based scheduling only (i.e. bearer less model).
5. Some networks may be pre-configured to support certain kinds of devices. In this case, the network can use this indication from the UE to decide whether the requested service is supported or not. Accordingly, the network can decide whether the requested service can or cannot be offered to the UE. If it cannot be offered to the UE, then the network can use this indication to reject the UE.
6. Network can perform charging/billing based on the requested resources.

Table 1 illustrates additional detailed information regarding the request type for attach:

TABLE 1

| Request Type | Interpretation | Functional impact |
| --- | --- | --- |
| Signaling connection only | UE needs only signaling connection to remain registered in the network. When UP is needed, UE can request for a new session setup to obtain other services | Network considers "Attached for signaling only". Allows subsequent service flow setup and ensures service segregation. Also, ensures that the UE is not detached when the last service flow is deactivated. |
| Signaling connection + network connectivity/ internet services only | UE needs "always on" network connectivity however UE does not need GBR services on top. If the UE needs other services, then UE must detach and re-attach using appropriate request type. | Network considers "Attached for only one service". Subsequent service flow setup is not allowed. UE needs to detach and re-attach and use a different request type in order to request for more than one service. |
| Signaling connection + network connectivity/ internet services | UE needs "always on" connectivity for internet services. UE can request for a new session setup to obtain other services. | Network considers "Attached with always on connectivity". Subsequent service flow setup is allowed. When the last service flow is deactivated, UE can be deregistered from the network. |
| Signaling connection + network connectivity/other services as requested | UE needs "always on" connectivity and it can specially request for a certain service by providing service identifier (or APN) | Network considers "Attached with always on connectivity". Subsequent service flow setup is allowed. When the last service flow is deactivated, UE can be deregistered from the network. |

Figure 2:
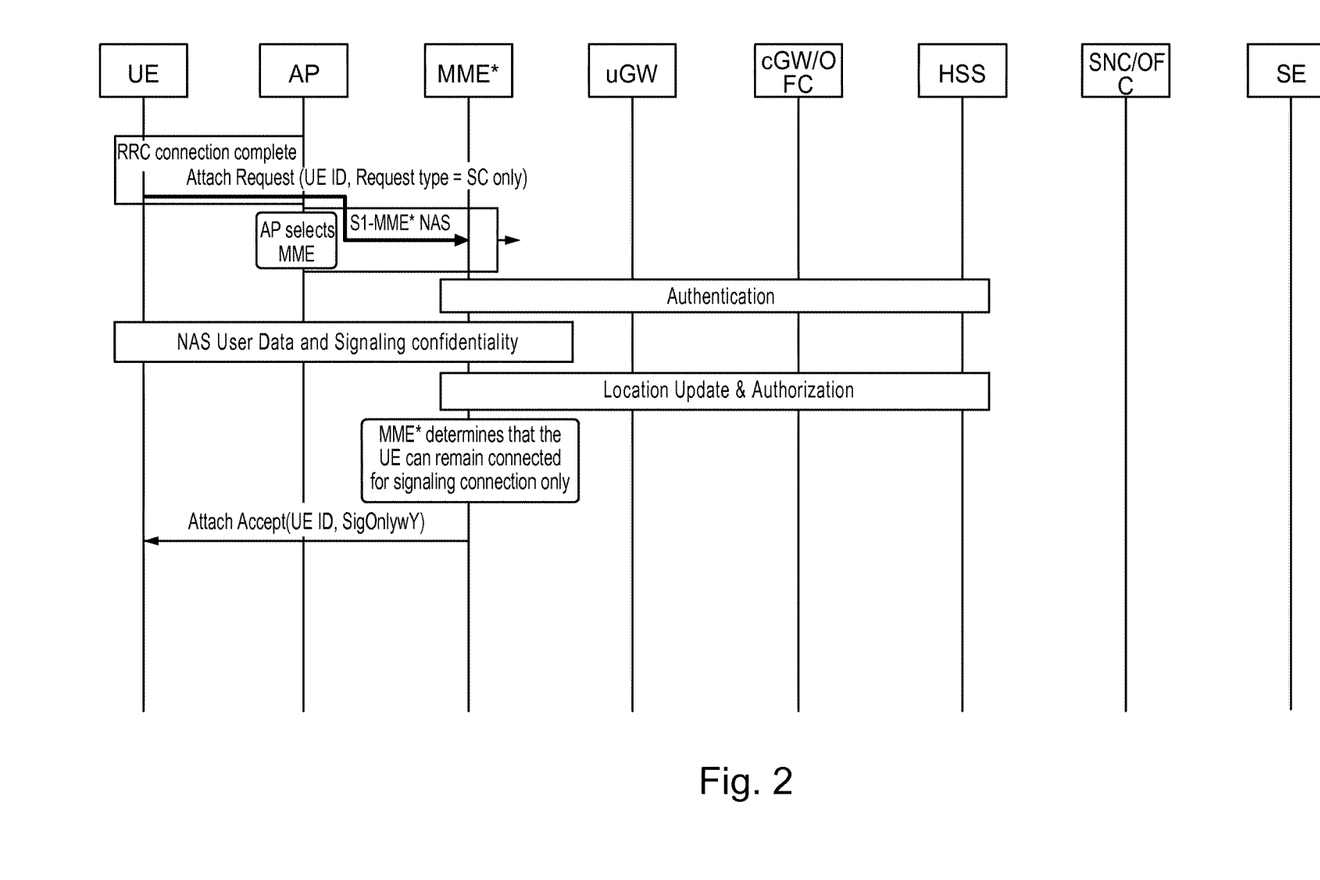
FIG. 2 illustrates an example call flow diagram, according to one embodiment.

FIG. 2 illustrates an example call flow diagram for an attach procedure for class A devices, according to an embodiment. As introduced above, class A devices are those that require signaling connection only. Examples may include M2M devices that do not require "always on" connectivity, and H2H devices (converted from old PSTN) that are not "always on".

As illustrated in FIG. 2, in this embodiment, the device requests for a signaling connection only. The network then ensures that the device is subscribed and it can be authenticated to register with the network. However, the network does not establish any resource for user plane establishment. The network considers the UE to be "attached for signaling connection only". And the UE is allowed to request for a new service flow setup.

Figure 3A:
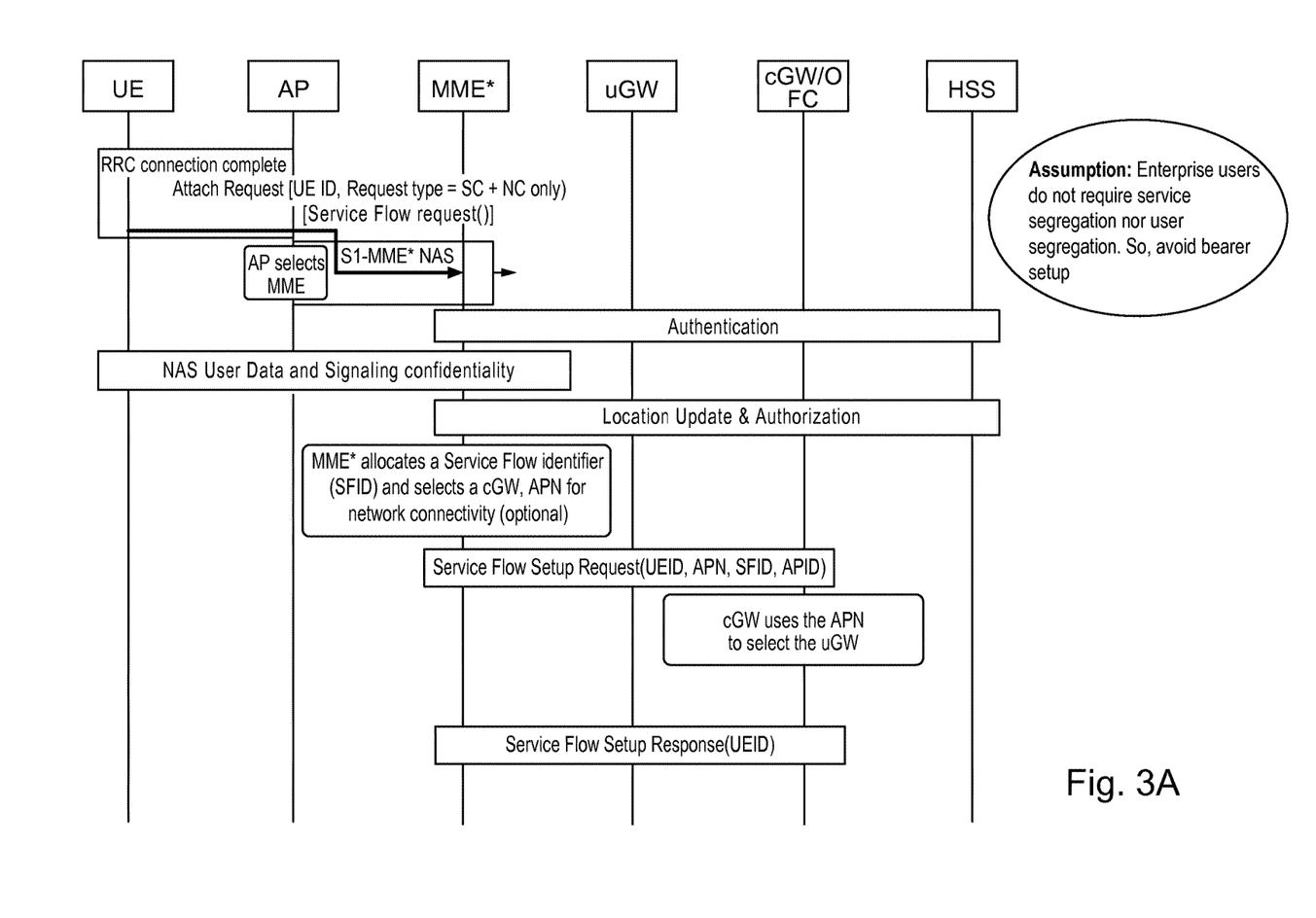
FIGS. 3A and 3B illustrates an example call flow diagram, according to another embodiment.
Figure 3B:
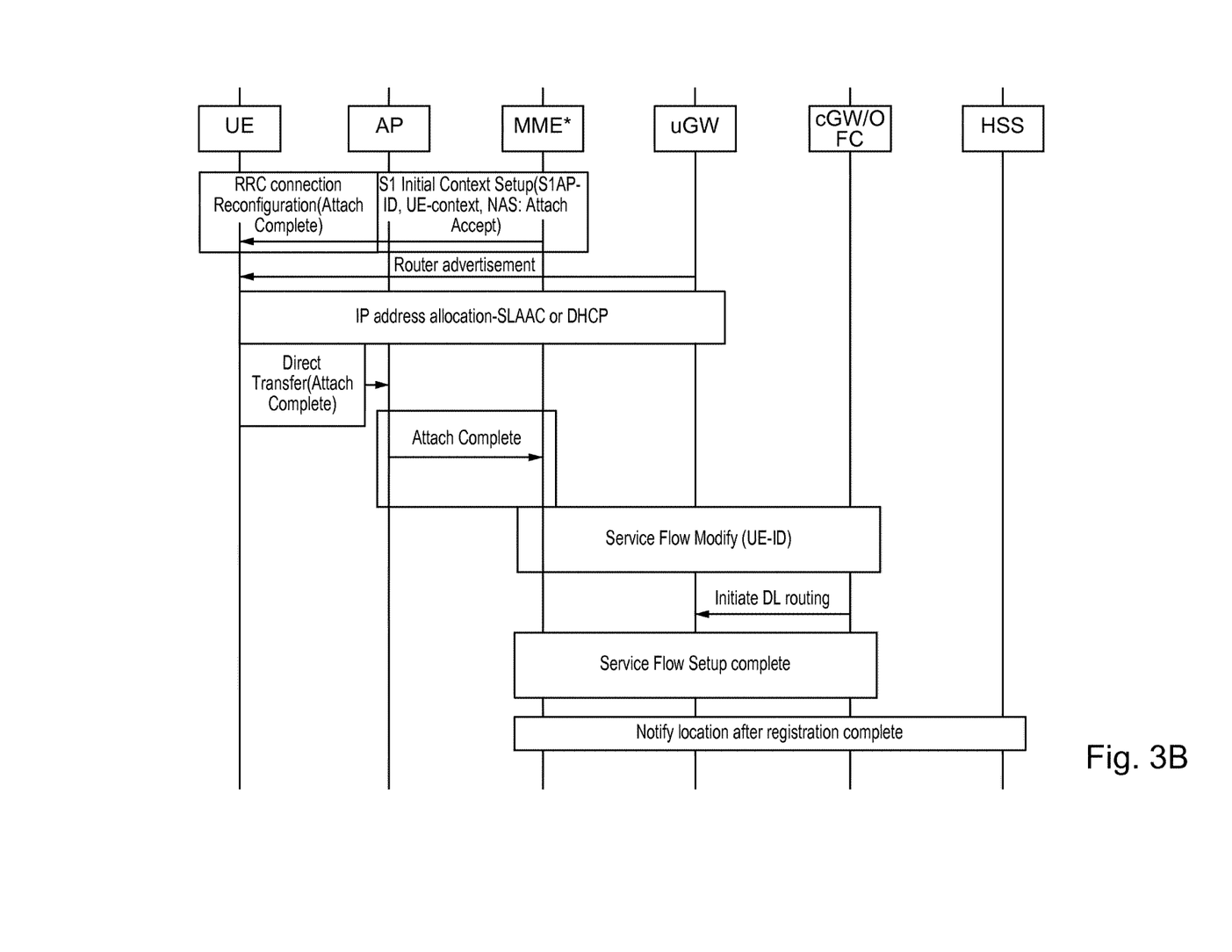

FIGS. 3A and 3B illustrates an example call flow diagram of an attach procedure for class B devices (illustrated with GRE tunnel setup), according to one embodiment. As introduced above, class B devices require signaling connection and internet services/default network connectivity only. Such devices are not expected to require GBR services. Examples of such devices may include printers, fax machines, scanners, etc. in an enterprise deployment.

As illustrated in FIGS. 3A and 3B, in this embodiment, a device requests for signaling connection and default network connectivity only. The network ensures that the device is subscribed and it can be authenticated to register with the network. The network also ensures that the device is subscribed to obtain default network connectivity. The network then establishes user plane for default network connectivity and provides an IP address to the UE. This may involve GRE or (P)MIP tunnel setup. The network considers the UE to be "Attached for only one service". In an embodiment, the network could decide that all the user plane packets can be transmitted over a radio link (without setting up logical radio flow). The network may also decide to perform class based scheduling only (i.e., bearer less model). Subsequent service flow setup is not allowed. If the UE (class B devices) initiates subsequent service flow and the network determines that the UE was "Attached for only one service" from internally stored UE context, the network can reject the service flow setup request from the UE. The UE would need to detach and re-attach with the network. It should use a different request type in order to request for more than one service.

Figure 4:
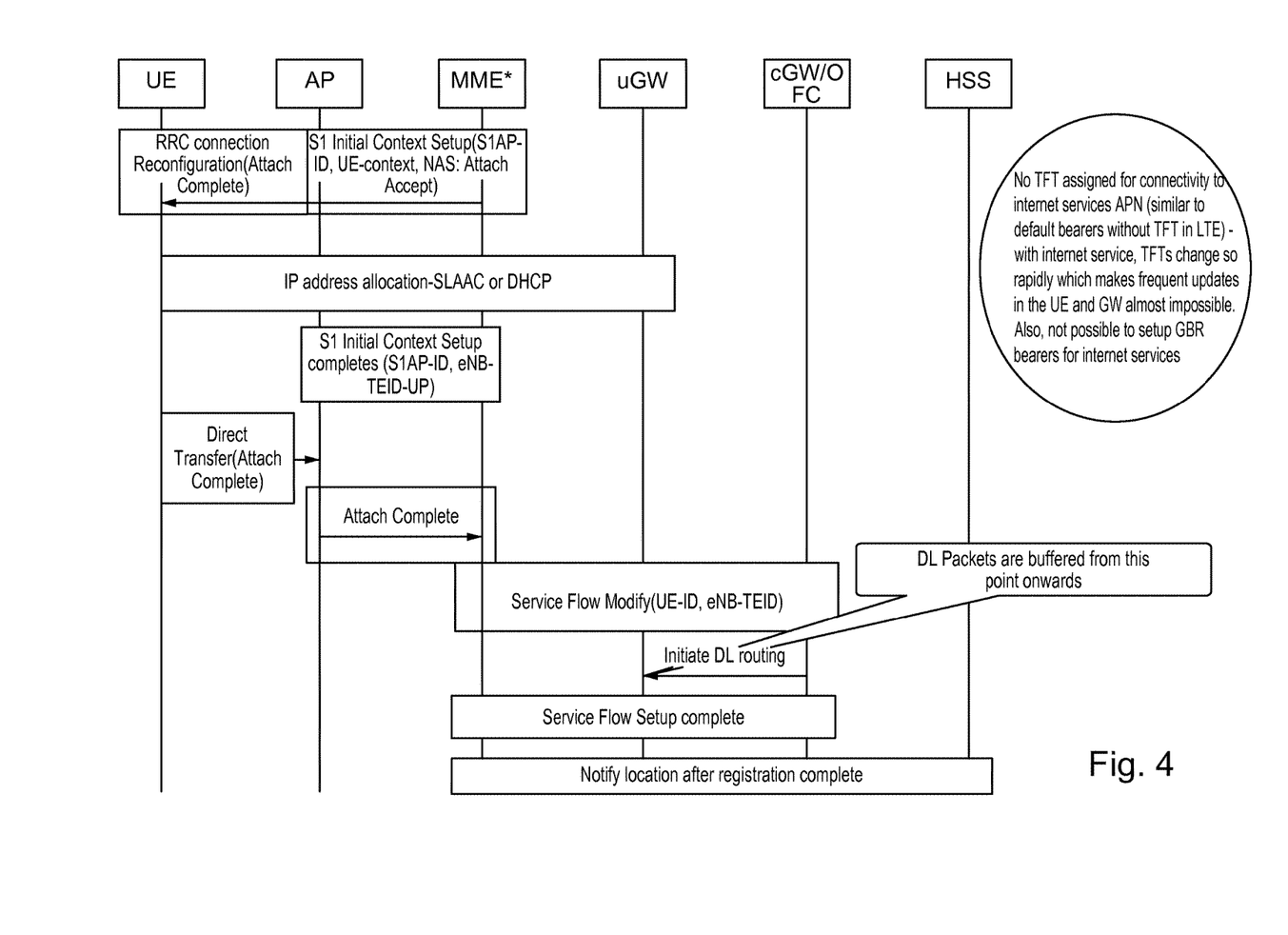
FIG. 4 illustrates an example call flow diagram, according to another embodiment.

FIG. 4 illustrates an example call flow diagram of an attach procedure for class C devices (illustrated with GRE tunnel setup), according to an embodiment. As introduced above, class C devices require a signaling connection and "always on" connectivity. Such devices may require multiple services and may also require GBR services (e.g., real time services). Examples of such devices may include vehicle-to-vehicle (V2V) devices, PubS devices, devices that require VoLTE/video call.

As illustrated in FIG. 4, in this embodiment, a device requests for signalling connection and "always on" connectivity. The network ensures that the device is subscribed and it can be authenticated to register with the network. The network also ensures that the device is subscribed to obtain "always on" network connectivity. The network then establishes user plane for default network connectivity and provides an IP address to the UE. This may involve GRE or (P)MIP tunnel setup. The network considers the UE to be "Attached with "always on" connectivity", and the network decides to perform radio flow setup. So, it decides to perform service flow based scheduling only (e.g., bearer based model). Subsequent service flow setup is also allowed. The network also ensures user segregation and service segregation for the device. As an alternative option, the UE may provide the type of service it requires in the attach request and the network may establish service flow (e.g., specially defined service identifier or so called, APN) as part of the attach procedure. The network may also establish service flow for the corresponding service based on the service identifier or APN and it also takes subscription and operator policy into account. Furthermore, such an UE is allowed request for a new service flow setup when it is "attached with always on connectivity".

Figure 5A:
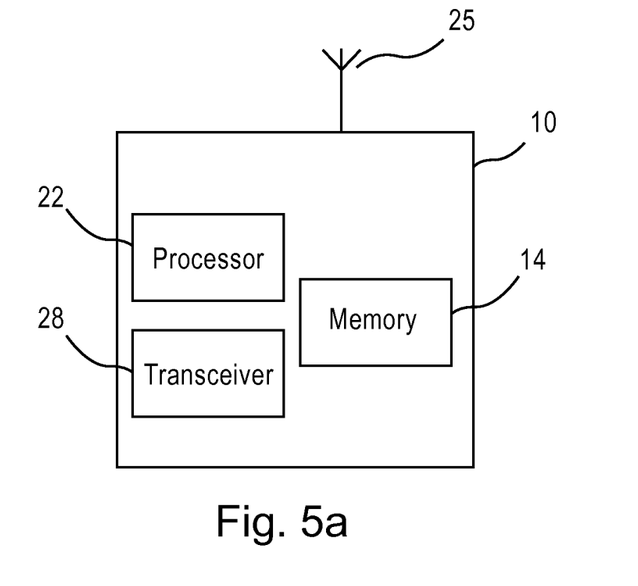
FIG. 5a illustrates a block diagram of an apparatus, according to one embodiment.

FIG. 5a illustrates an example of an apparatus 10 according to an embodiment. In an embodiment, apparatus 10 may be a node, host, or server in a communications network or serving such a network. It should be noted that one of ordinary skill in the art would understand that apparatus 10 may include components or features not shown in FIG. 5a.

As illustrated in FIG. 5a, apparatus 10 includes a processor 22 for processing information and executing instructions or operations. Processor 22 may be any type of general or specific purpose processor. While a single processor 22 is shown in FIG. 5a, multiple processors may be utilized according to other embodiments. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 10 may further include or be coupled to a memory 14 (internal or external), which may be coupled to processor 22, for storing information and instructions that may be executed by processor 22. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, or any other type of non-transitory machine or computer readable media. The instructions stored in memory 14 may include program instructions or computer program code that, when executed by processor 22, enable the apparatus 10 to perform tasks as described herein.

Apparatus 10 may also include or be coupled to one or more antennas 25 for transmitting and receiving signals and/or data to and from apparatus 10. Apparatus 10 may further include or be coupled to a transceiver 28 configured to transmit and receive information. For instance, transceiver 28 may be configured to modulate information on to a carrier waveform for transmission by the antenna(s) 25 and demodulate information received via the antenna(s) 25 for further processing by other elements of apparatus 10. In other embodiments, transceiver 28 may be capable of transmitting and receiving signals or data directly.

Processor 22 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

In an embodiment, memory 14 may store software modules that provide functionality when executed by processor 22. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In one embodiment, apparatus 10 may be, for example, a UE or mobile device, such as a smart phone, tablet, printer, fax machine, scanner, or other user device, etc. In this embodiment, apparatus 10 may be controlled by memory 14 and processor 22 to determine the type of services the UE requires from the network, for example, based on a configuration within the UE. Apparatus 10 may then be controlled by memory 14 and processor 22 to send a request type indicating the type of services required to the network. In certain embodiments, the request type may indicate that the UE requires a signaling connection only, a signaling connection and network connectivity/internet services only, a signaling connection and network connectivity/default services based on subscription, or a signaling connection and network connectivity/other services as requested.

Figure 5B:
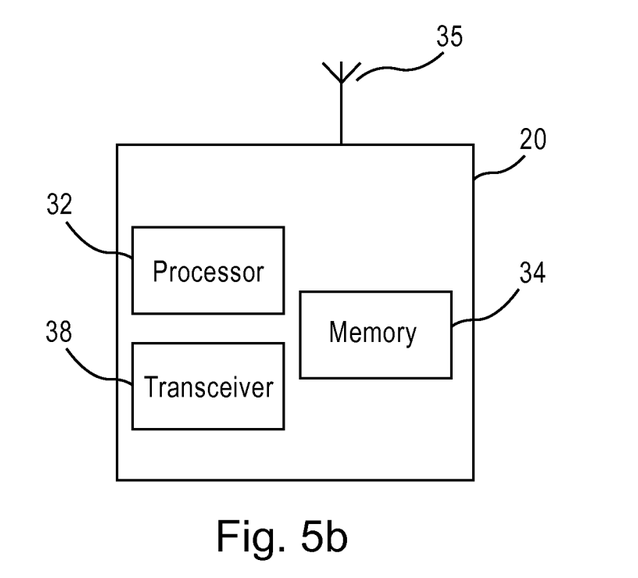
FIG. 5b illustrates a block diagram of an apparatus, according to another embodiment.

FIG. 5b illustrates an example of an apparatus 20 according to an embodiment. In an embodiment, apparatus 20 may be a node, host, or server in a communications network or serving such a network. In one embodiment, apparatus 20 may be a base station, radio network controller, eNodeB, or other network node. It should be noted that one of ordinary skill in the art would understand that apparatus 20 may include components or features not shown in FIG. 5b.

As illustrated in FIG. 5b, apparatus 20 may include a processor 32 for processing information and executing instructions or operations. Processor 32 may be any type of general or specific purpose processor. While a single processor 32 is shown in FIG. 5b, multiple processors may be utilized according to other embodiments. In fact, processor 32 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples.

Apparatus 20 may further comprise or be coupled to a memory 34 (internal or external), which may be coupled to processor 32, for storing information and instructions that may be executed by processor 32. Memory 34 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 34 may be comprised of any combination of random access memory (RAM), read only memory (ROM), static storage such as a magnetic or optical disk, or any other type of non-transitory machine or computer readable media. The instructions stored in memory 34 may include program instructions or computer program code that, when executed by processor 32, enable the apparatus 20 to perform tasks as described herein.

Apparatus 20 may also comprise or be coupled to one or more antennas 35 for transmitting and receiving signals and/or data to and from apparatus 20. Apparatus 20 may further comprise or be coupled to a transceiver 38 configured to transmit and receive information. The transceiver may be an external device, such as a remote radio head. For instance, transceiver 38 may be configured to modulate information on to a carrier waveform for transmission by the antenna(s) 35 and demodulate information received via the antenna(s) 35 for further processing by other elements of apparatus 20. In other embodiments, transceiver 38 may be capable of transmitting and receiving signals or data directly.

Processor 32 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

In an embodiment, memory 34 stores software modules that provide functionality when executed by processor 32. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

As mentioned above, according to one embodiment, apparatus 20 may be a base station, radio network controller, eNodeB, or other node in a network. In this embodiment, apparatus 20 may be controlled by memory 34 and processor 32 to receive a request type from a UE. The request type may indicate the type of services required by the UE from the network. In an embodiment, apparatus 20 may then be controlled by memory 34 and processor 32 to use the received request type to make certain determinations regarding the provision of services to the UE. For example, apparatus 20 may be controlled to determine: whether the UE requires signaling connection only, whether user plane should be setup as part of attach procedure, whether the UE requires only one service for the life time of the registration (also indicate whether service segregation is necessary or not), whether UE requires "always on" connectivity, and/or whether UE requires connectivity to a special service.

In an embodiment, apparatus 20 may be further controlled by memory 34 and processor 32 to establish a UE context according to the determinations made using the received request type. For example, apparatus 20 may be controlled to provide "Attached for signaling only" connectivity, to provide "Attached for only one service" connectivity, or to provide "Attached with always on" connectivity. According to one embodiment, apparatus 20 may then be controlled by memory 34 and processor 32 to allocate radio resources and decide on a scheduling method based on the type of registration. For example, if the UE belongs to class A or class C, then apparatus 20 ensures that user segregation and service segregation is possible. As a result, apparatus 20 may decide that the UE may require individual service flow setup over the radio (and service flow based scheduling) (i.e., bearer based model). Apparatus 20 may decide to perform class based scheduling for non-GBR services. If the UE belongs to class B, then apparatus 20 need not offer service segregation. So, apparatus 20 may decide that all the user plane packets can be transmitted over the radio link without establishing logical radio bearers. It may also decide to perform class based scheduling only (i.e. bearer less model).

In one embodiment, apparatus 20 may be controlled by memory 34 and processor 32 to perform charging or billing based on the resources requested by the UE as indicated in the received request type.

Another embodiment may be directed to a method that includes determining, by a UE, the type of services that the UE requires from a network, for example, based on a configuration within the UE. The method may then include sending a request type indicating the type of services required by the UE to the network. In certain embodiments, the request type may indicate that the UE requires a signaling connection only, a signaling connection and network connectivity/internet services only, a signaling connection and network connectivity/default services based on subscription, or a signaling connection and network connectivity/other services as requested.

Another embodiment is directed to a method that includes receiving, by a network node, a request type from a UE. The request type may indicate the type of services required by the UE from the network. The method may then include using the received request type to make certain determinations regarding the provision of services to the UE. For example, the step of using may further include determining: whether the UE requires signaling connection only, whether user plane should be setup as part of attach procedure, whether the UE requires only one service for the life time of the registration (also indicate whether service segregation is necessary or not), whether UE requires "always on" connectivity, and/or whether UE requires connectivity to a special service.

In an embodiment, the method may also include establishing a UE context according to the determinations made using the received request type. For example, the establishing step may further include providing "Attached for signaling only" connectivity, providing "Attached for only one service" connectivity, or providing "Attached with always on" connectivity. According to one embodiment, the method may also include allocating radio resources and deciding on a scheduling method based on the type of registration. For example, if the UE belongs to class A or class C, then it is ensured that user segregation and service segregation is possible. As a result, the method may include deciding that the UE may require individual service flow setup over the radio (and service flow based scheduling) (i.e., bearer based model). The method may also include deciding to perform class based scheduling for non-GBR services. If the UE belongs to class B, then the method may include deciding that all the user plane packets can be transmitted over the radio link without establishing logical radio bearers. It may also include deciding to perform class based scheduling only (i.e. bearer less model).

In one embodiment, the method may further include performing charging or billing based on the resources requested by the UE as indicated in the received request type.

In some embodiments, the functionality of any of the methods described herein may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

In view of the above, embodiments of the invention may provide several advantages. For example, some advantages include providing a solution to flexibly support different kinds of services based on requests from UE. In addition, charging/billing may be adjusted based on the optimizations performed and resources allocated within the network for the requested service and therefore the subscriber can be charged based on the requested service and service provided by the network.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

I claim:

1. A method, comprising:
receiving, by a network node, a request type from a user equipment, wherein the request type indicates types of services required by the user equipment from the network;
using the received request type to make determinations regarding a provision of services to the user equipment; and
establishing a user equipment context according to the determinations made using the received request type,
wherein the using comprises determining at least whether the user equipment requires a signaling connection only.

2. The method according to claim 1, wherein the using further comprises determining at least one of: whether user plane should be setup as part of attach procedure, whether the user equipment requires only one service for the life time of the registration, whether the user equipment requires "always on" connectivity, or whether the user equipment requires connectivity to a special service.

3. The method according to claim 1, wherein the establishing further comprises providing at least one of: "attached for signaling only" connectivity, "attached for only one service" connectivity, or "attached with always on" connectivity.

4. The method according to claim 1, further comprising allocating radio resources and deciding on a scheduling method based on the types of services.

5. The method according to claim 1, further comprising performing charging or billing based on the resources requested by the user equipment as indicated in the received request type.

6. A computer program, embodied on a non-transitory computer readable medium, the computer program configured to control a processor to perform a method according to claim 1.

7. An apparatus, comprising:
at least one processor; and
at least one memory including computer program code,
the at least one memory and the computer program code configured, with the at least one processor, to cause the apparatus at least to
receive a request type from a user equipment, wherein the request type indicates types of services required by the user equipment from a network;
use the received request type to make determinations regarding a provision of services to the user equipment; and
establish a user equipment context according to the determinations made using the received request type,
wherein the apparatus is configured to use the received request type to determine at least whether the user equipment requires a signaling connection only.

8. An apparatus, comprising:
receiving means for receiving a request type from a user equipment, wherein the request type indicates types of services required by the user equipment from the network;
using means for using the received request type to make determinations regarding a provision of services to the user equipment; and
establishing means for establishing a user equipment context according to the determinations made using the received request type,
wherein the using means comprises determining means for determining at least whether the user equipment requires a signaling connection only.

9. The apparatus according to claim 8, wherein the using means further comprises determining means for determining at least one of: whether user plane should be setup as part of attach procedure, whether the user equipment requires only one service for the life time of the registration, whether the user equipment requires "always on" connectivity, or whether the user equipment requires connectivity to a special service.

10. The apparatus according to claim 8, wherein the establishing means further comprises providing means for providing at least one of: "attached for signaling only" connectivity, "attached for only one service" connectivity, or "attached with always on" connectivity.

11. The apparatus according to claim 8, further comprising allocating means for allocating radio resources and deciding on a scheduling method based on the types of services.

12. The apparatus according to claim 8, further comprising performing means for performing charging or billing based on the resources requested by the user equipment as indicated in the received request type.

13. A method, comprising:
determining, by a user equipment, types of services that the user equipment requires from a network based on a configuration stored within the user equipment;
sending a request type, indicating the types of services required by the user equipment, to the network,
wherein the request type indicates whether the user equipment requires a signaling connection only, a signaling connection and network connectivity/internet services only, a signaling connection and network connectivity/default services based on subscription, or a signaling connection and network connectivity/other services as requested.

14. An apparatus, comprising:
at least one processor; and
at least one memory including computer program code,
the at least one memory and the computer program code configured, with the at least one processor, to cause the apparatus at least to
determine types of services that the apparatus requires from a network based on a configuration stored within the apparatus;
send a request type, indicating the types of services required by the apparatus, to the network,
wherein the request type indicates whether the apparatus requires a signaling connection only, a signaling connection and network connectivity/internet services only, a signaling connection and network connectivity/default services based on subscription, or a signaling connection and network connectivity/other services as requested.

15. An apparatus, comprising:
determining means for determining types of services that the apparatus requires from a network based on a configuration stored within the apparatus;
sending means for sending a request type, indicating the types of services required by the apparatus, to the network,
wherein the request type indicates whether the apparatus requires a signaling connection only, a signaling connection and network connectivity/internet services only, a signaling connection and network connectivity/default services based on subscription, or a signaling connection and network connectivity/other services as requested.

\* \* \* \* \*